United States Patent
Satoh et al.

(10) Patent No.: US 9,701,218 B2
(45) Date of Patent: Jul. 11, 2017

(54) SEAT SLIDE DEVICE

(71) Applicant: AISIN SEIKI KABUSHIKI KAISHA, Kariya (JP)

(72) Inventors: Takanori Satoh, Kasugai (JP); Koji Kumagai, Chiryu (JP); Makoto Sakai, Anjo (JP); Yasuhiro Kojima, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/022,141

(22) PCT Filed: Oct. 24, 2014

(86) PCT No.: PCT/JP2014/078373
§ 371 (c)(1),
(2) Date: Mar. 15, 2016

(87) PCT Pub. No.: WO2015/060435
PCT Pub. Date: Apr. 30, 2015

(65) Prior Publication Data
US 2016/0221476 A1 Aug. 4, 2016

(30) Foreign Application Priority Data

Oct. 25, 2013 (JP) ................................. 2013-222346
Oct. 25, 2013 (JP) ................................. 2013-222347
(Continued)

(51) Int. Cl.
*B60N 2/07* (2006.01)
*B60N 2/08* (2006.01)

(52) U.S. Cl.
CPC ......... *B60N 2/0818* (2013.01); *B60N 2/0705* (2013.01); *B60N 2/0715* (2013.01); *B60N 2/085* (2013.01); *B60N 2/0881* (2013.01)

(58) Field of Classification Search
CPC ...... B60N 2/0705; B60N 2/0722; B60N 2/08; B60N 2/0715; B60N 2/0818; B60N 2/085; B60N 2/01182; B60N 2/0881; B60B 2/07
(Continued)

(56) References Cited

U.S. PATENT DOCUMENTS 8,469,328 B2 * 6/2013 Nakamura ........... B60N 2/0705
248/424
8,616,515 B2 * 12/2013 Hayashi ............... B60N 2/0705
248/424
(Continued)

FOREIGN PATENT DOCUMENTS

| EP | 2 733 013 A1 | 5/2014 |
|---|---|---|
| JP | 2002-154355 A | 5/2002 |

(Continued)

OTHER PUBLICATIONS

International Preliminary Report on Patentability and Written Opinion issued Apr. 26, 2016 in PCT/JP2014/078373 (English Translation only).

(Continued)

*Primary Examiner* — Tan Le
(74) *Attorney, Agent, or Firm* — Oblon, McClelland, Maier & Neustadt, L.L.P.

(57) ABSTRACT

In a case where an engagement member is assembled on an upper rail, a second rotary shaft portion is inserted to a shaft receiving bore of a first side wall portion from an inner side of an upper rail. After the insertion, the engagement member is rotated so that the second rotary shaft portion is inserted to the shaft receiving bore of the second side wall portion. At this time, because a shaft allowable length is specified to be greater than a shaft maximum rotation length, an interruption of an insertion of the rotary shaft portion because of a contact of the second rotary shaft portion with an edge (Continued)

portion of the shaft receiving bore at the second side wall portion is restrained.

13 Claims, 13 Drawing Sheets

(30) Foreign Application Priority Data

Oct. 25, 2013 (JP) .................................. 2013-222348
Oct. 24, 2014 (JP) .................................. 2014-216862

(58) Field of Classification Search
USPC ............. 248/424, 429, 430; 297/344.1, 473; 296/65.13
See application file for complete search history.

(56) References Cited

U.S. PATENT DOCUMENTS

| | | | | |
|---|---|---|---|---|
| 8,750,534 B2* | 6/2014 | Yamkovoy | ........... | H04R 1/1091 381/111 |
| 9,371,013 B2* | 6/2016 | Nakamura | ........... | B60N 2/0705 |
| 2008/0231101 A1 | 9/2008 | Sakakibara et al. | | |
| 2012/0132778 A1 | 5/2012 | Nakamura et al. | | |
| 2013/0206952 A1* | 8/2013 | Yamada | ................ | B60N 2/0722 248/429 |
| 2016/0221476 A1* | 8/2016 | Satoh | ................... | B60N 2/0705 |

FOREIGN PATENT DOCUMENTS

| | | |
|---|---|---|
| JP | 2003-252086 A | 9/2003 |
| JP | 2008-184033 A | 8/2008 |
| JP | 2010-095171 A | 4/2010 |
| JP | 2010-100077 A | 5/2010 |
| JP | 2010-195269 A | 9/2010 |
| JP | 2012-111378 A | 6/2012 |
| JP | 2013-052843 A | 3/2013 |
| JP | 2013-052844 A | 3/2013 |
| WO | 2013/008630 A1 | 1/2013 |

OTHER PUBLICATIONS

International Search Report issued on Jan. 27, 2015 for PCT/JP2014/078373 filed on Oct. 24, 2014.
Notification of Reasons for Refusal issued Oct. 18, 2016 in Japanese Patent Application No. 2013-222346 (with English language translation).

* cited by examiner

SEAT SLIDE DEVICE

TECHNICAL FIELD

This invention relates to a seat slide device.

BACKGROUND ART

A seat slide device for a vehicle configured so that a position of a seat for a vehicle is adjustable in a front-rear direction of a vehicle has been conventionally known. A seat slide device for a vehicle described in Patent document 1 includes a lower rail, an upper rail mounted at the lower rail to be movable relative thereto, and an engagement member disposed within a void formed between the lower rail and the upper rail.

Specifically, as illustrated in FIG. 16, an engagement member 120 includes plural engagement protrusions 124 at an end so as to protrude in a width direction W. Engagement protrusion bores 149 are provided at two surfaces of an upper rail 130, two surfaces facing each other in the width direction W. In a case where the engagement member 120 is disposed within the upper rail 130, each of the engagement protrusions 124 passes through each of the engagement protrusion bores 149 so as to protrude from the upper rail 130 in the width direction W. Thus, tip ends of the engagement protrusions 124 are exposed to the outer side of the upper rail 130 so as to be engageable with a lower rail (not illustrated). The engagement member 120 includes a rotary shaft 128 which includes a substantially column configuration.

According to the seat slide device in Patent document 1, single upper rail is configured to be divided. Specifically, as illustrated in FIG. 16, the upper rail 130 is constituted by a first member 130a and a second member 130b. In order to assemble the engagement member 120 on the upper rail 130, first, the engagement member 120 is disposed between the first member 130a and the second member 130b in a state where the first member 130a and the second member 130b are separated from each other in the width direction W. Then, the first member 130a and the second member 130b are brought to come closer to each other so that the engagement protrusions 124 are inserted to the engagement protrusion bores 149 of the upper rail 130. In addition, the rotary shaft 128 of the engagement member 120 is also inserted to shaft bores 131 formed at the members 130a and 130b respectively. Then, the first and second members 130a and 130b are tightened to each other by a fastener such as a bolt and a nut, for example, which are not illustrated.

Because the upper rail 130 is configured to be divided in the width direction W, the engagement member 120 may be assembled on the upper rail 130 regardless of the length of each of the engagement protrusions 124 and the rotary shaft 128 in the width direction W.

In addition, the engagement member 120 is supported to be rotatable within the upper rail 130. The engagement protrusions 124 selectively engage with and disengage from lock bores (of which illustration is omitted) of the lower rail depending on a rotation position of the engagement member 120. Accordingly, the seat slide device for the vehicle may prohibit or permit the upper rail 130 to move relative to the lower rail which is fixed to a vehicle floor.

Further, Patent document 2, for example, discloses a construction where one support pin is inserted to a side wall of an upper rail and an engagement member so as to support the engagement member within the upper rail. Furthermore, Patent document 3, for example, discloses a construction where an operation lever is rotatably supported via a support pin and an engagement member is supported at an upper rail in a simple non-rotatable manner by a fitting protruding portion formed at the engagement member.

DOCUMENT OF PRIOR ART

Patent Document

Patent Document 1: Japanese Patent Application Publication 2013-52843
Patent Document 2: Japanese Patent Application Publication 2008-184033
Patent Document 3: Japanese Patent Application Publication 2010-95171

SUMMARY OF INVENTION

Problem to be Solved by Invention

In the construction of Patent document 1 as disclosed in the aforementioned FIG. 16, the engagement member 120 is positioned between the first and second members 130a and 130b upon assembly of the upper rail 130. Then, the members 130a and 130b are assembled on each other. In this case, the upper rail 130 is necessarily configured so that the upper rail 130 can be divided, which increases the number of components of the seat slide device.

In addition, in the seat slide device disclosed in each of Patent document 1 and Patent document 2, a construction for supporting the engagement member by the upper rail so that the engagement member is rotatable is complicated. Thus, the present invention includes an object to provide a seat slide device which includes a simpler construction.

In addition, in the seat slide device disclosed in each of Patent document 1 and Patent document 3, in a case where an impact is applied to the engagement member, the engagement protrusions receive a reaction force from the lock bores. Because of the reaction force, a rotation force about a rotary shaft portion is applied to the engagement member. As a result, the engagement protrusions disengage from the lock bores of the lower rail, which may cause the upper rail to be rotatable relative to the lower rail. Therefore, the present invention includes an object to provide a seat slide device which restrains an upper rail from being inadvertently rotatable relative to a lower rail.

Means for Solving Problem

A seat slide device which solves the aforementioned drawbacks includes a first rail, a second rail connected to the first rail to be movable relative to the first rail along a longitudinal direction of the first rail, and an engagement member rotatably supported within the second rail. The second rail includes first and second side wall portions facing each other in a width direction orthogonal to a longitudinal direction of the second rail. Each of the first and second side wall portions is provided with a first receiving bore and a second receiving bore, the first receiving bore and the second receiving bore into which respective portions of the engagement member are inserted. The engagement member includes a body portion, first and second side surfaces extending in a longitudinal direction of the body portion, engagement protrusions protruding from the first and second side surfaces to an outer side of the second rail via the first receiving bores respectively, the engagement protrusions moving between an engagement position at which the engagement protrusions engage with the first rail and a release position at which the engagement protrusions separate from the first rail depending on a rotation position of the engagement member, a first rotary shaft portion provided at the first side surface of the body portion and inserted to be rotatably positioned within the second receiving bore of the first side wall portion of the second rail, and a second rotary shaft portion provided at the second side surface of the body portion and inserted to be rotatably positioned within the second receiving bore of the second side wall portion of the second rail. A shaft allowable length is defined by a length of an imaginary line connecting a first end portion in a height direction orthogonal to the longitudinal direction and a width direction of the body portion at the second receiving bore of the first side wall portion and a second end portion in the height direction at the second receiving bore of the second side wall portion, the second end portion being provided at an opposite side from the first end portion. A shaft maximum rotation length is defined by a length of an imaginary line connecting the second side surface of the body portion and a tip end of the first rotary shaft portion provided at the first side surface of the body portion. The shaft allowable length is specified to be greater than the shaft maximum rotation length.

In a case where the engagement member is assembled on the second rail, the first rotary shaft portion is inserted to the shaft receiving bore of the first side wall portion from an inner side of the second rail. After the insertion, the engagement member is rotated so that the second rotary shaft portion is inserted to the shaft receiving bore of the second side wall portion. At this time, because the shaft allowable length is specified to be greater than the shaft maximum rotation length, an interruption of an insertion of the second rotary shaft portion to the shaft receiving bore because of a contact of the rotary shaft portion with an edge portion of the shaft receiving bore at the second side wall portion is restrained. Thus, the second rotary shaft portion is insertable into the shaft receiving bore at the second side wall portion. Accordingly, the engagement member may be easily assembled on the second rail.

MODE FOR CARRYING OUT THE INVENTION

First Embodiment

A first embodiment of the present invention is explained with reference to FIGS. 1 to 10.

[Schematic Construction]

Figure 1:
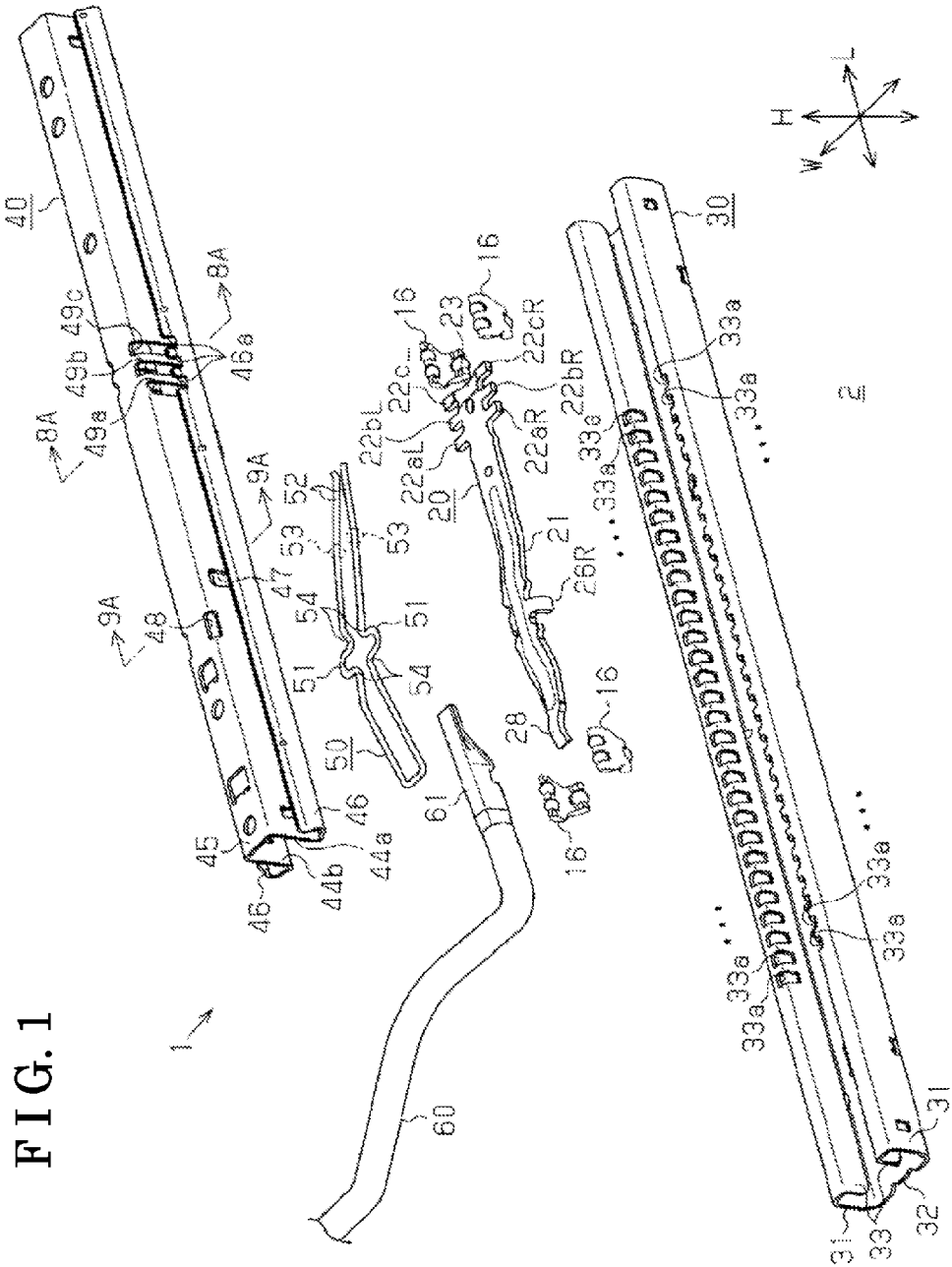
FIG. 1 is a perspective view illustrating a construction of a seat slide device according to a first embodiment.

As illustrated in FIG. 1, a seat slide device 1 for a vehicle includes a lower rail 30 corresponding to a first rail, an upper rail 40 corresponding to a second rail, an engagement member 20 and a spring 50.

The lower rail 30 extends in a longitudinal direction thereof and fixed to a vehicle floor 2. The longitudinal direction of the lower rail 30 is the same as a vehicle front-rear direction L. The upper rail 40 extends in a longitudinal direction thereof and is mounted to the lower rail 30 so as to be movable relative to the lower rail 30 in the longitudinal direction thereof.

Figure 2:
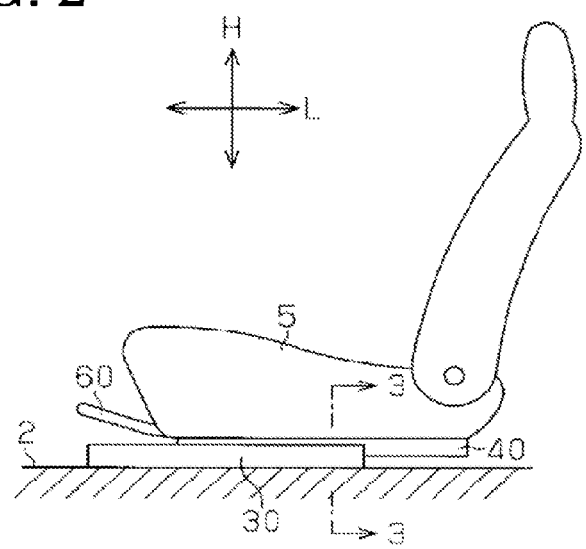
FIG. 2 is a side view of a seat at which the seat slide device in FIG. 1 is mounted.

A pair of lower rails 30 is disposed to be spaced away from each other in a width direction W orthogonal to the vehicle front-rear direction L. The upper rail 40 is mounted to each of the lower rails 30. As illustrated in FIG. 2, one seat 5 serving as a seating portion for an occupant is fixed to a pair of upper rails 40.

A release handle 60 is connected between the upper rails 40. The release handle 60 extends to the front side of the seat 5 from the upper rails 40 so as to be operable. The release handle 60 is pressed towards the vehicle floor 2 so that the upper rails 40, together with the seat 5, become movable relative to the lower rails 30. The construction of the seat slide device 1 for the vehicle is explained in detail below.

[Lower Rail]

Figure 3:
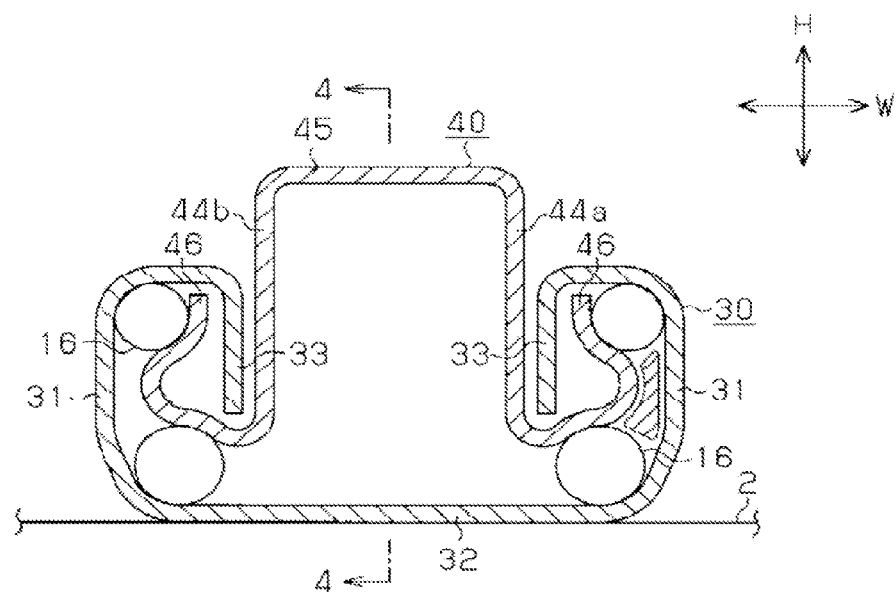
FIG. 3 is a cross-sectional view taken along a line 3-3 in FIG. 2.

As illustrated in FIG. 3, the lower rail 30 includes a connection wall portion 32, a pair of side wall portions 31 and a pair of folded wall portions 33.

The connection wall portion 32 is formed in a rectangular flat plate and is fixed on the vehicle floor 2. The side wall portions 31 extend upward at a substantially right angle from opposed ends of the connection wall portion 32 in a width direction thereof. Each of the folded wall portions 33 extends from an edge of the side wall portion 31 to an inner side of the lower rail 30 at a substantially right angle. An edge of the folded wall portion 33 is formed to extend towards the connection wall portion 32 at a substantially right angle.

As illustrated in FIG. 1, plural square lock bores 33a are formed at portions of the lower rail 30 where the folded wall portions 33 face each other. The plural lock bores 33a are formed at each of the folded wall portions 33 and are arranged at constant intervals along the longitudinal direction of each of the lower rails 30. Each of the lock bores 33a opens upward in a vehicle height direction H orthogonal to the width direction W and the longitudinal direction L.

Figure 4:
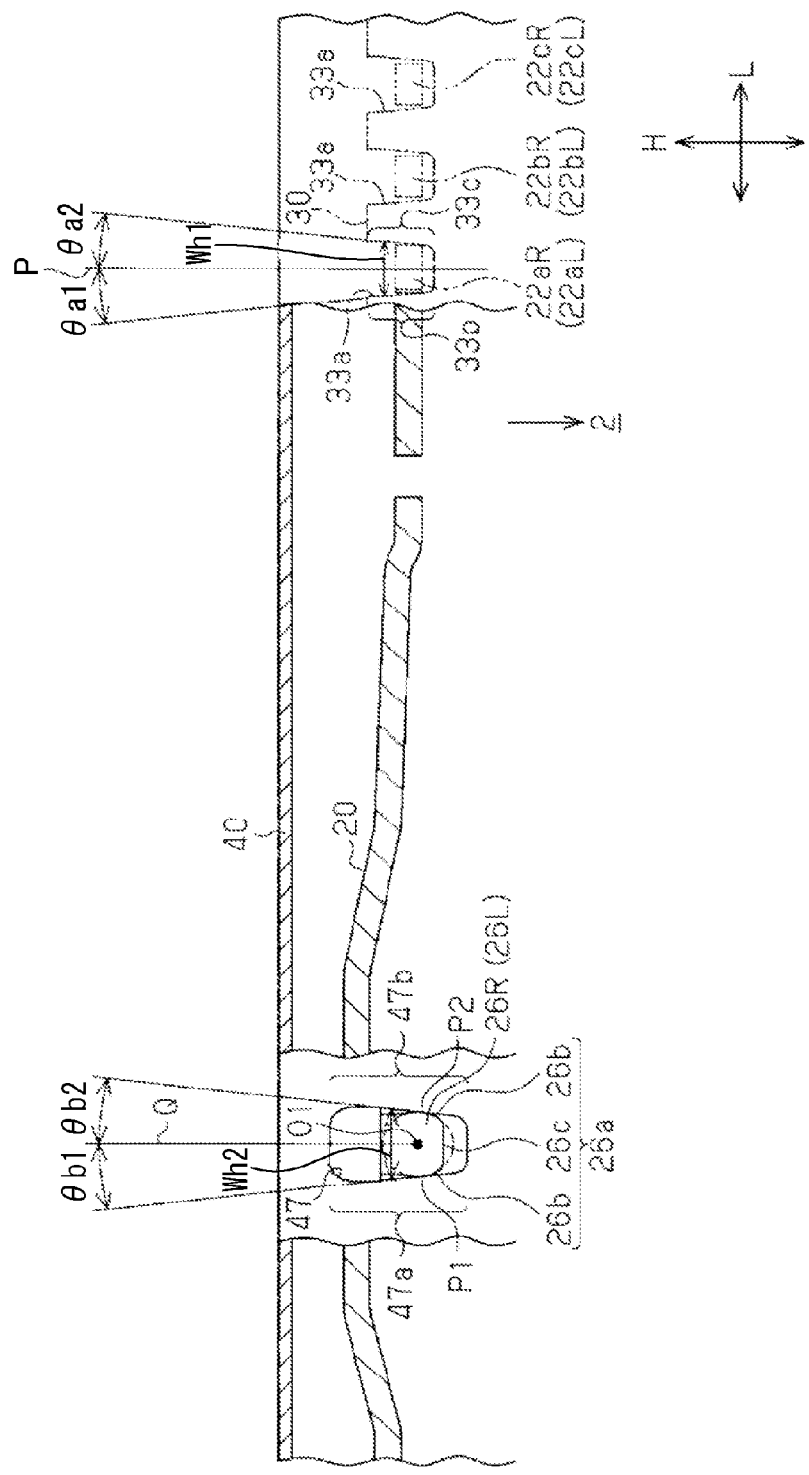
FIG. 4 is a cross-sectional view taken along a line 4-4 in FIG. 3.

As illustrated in FIG. 4, each of the lock bores 33a is formed in a substantially trapezoidal shape so that a bore width Wh1 decreases towards the vehicle floor 2 when viewed in the vehicle width direction W. That is, the lock bore 33a includes two side surfaces 33b and 33c facing along the vehicle longitudinal direction L. A distance between the side surfaces 33b and 33c decreases towards the vehicle floor 2.

Angles formed by the two protrusion side surfaces 33b and 33c of the lock bore 33a intersecting a center line P of the lock bore 33a which extends in the vehicle height direction H, i.e., height direction of the lower rail 30, are defined to be teeth portion pressure angles θa1 and θa2. In the present embodiment, the teeth portion pressure angle θa2 is an angle obtained by rotating relative to the center line P of the lock bore by a predetermined angle in a clockwise direction. The teeth portion pressure angle θa1 is an angle obtained by rotating relative to the center line P of the lock bore by a predetermined angle in a counterclockwise direction. In the present embodiment, the teeth portion pressure angles θa1 and θa2 are specified to be the same values.

[Upper Rail]

As illustrated in FIG. 3, the upper rail 40 includes a connection wall portion 45, first and second side wall portions 44a, 44b and a pair of folded wall portions 46.

The connection wall portion 45 of the upper rail 40 is formed in a rectangular flat plate in the same way as the aforementioned connection wall portion 32 of the lower rail 30. The side wall portions 44a and 44b extend towards the vehicle floor 2 at a substantially right angle from opposed ends of the connection wall portion 45 in the width direction W. The folded wall portions 46 extend outward and upward of the upper rail 40 from respective edges of the side wall portions 44a and 44b.

In a case where the upper rail 40 is assembled on the lower rail 30, the respective edges of the folded wall portions 33 of the lower rail 30 are positioned between the side wall portion 44a and the folded wall portion 46 and between the side wall portion 44b and the folded wall portion 46 of the upper rail 40. Thus, the upper rail 40 is restrained from separating and disengaging from the lower rail 30 and the upper rail 40 is movable along the lower rail 30.

As illustrated in FIG. 1, plural (for example, three) engagement protrusion bores 49a, 49b and 49c are provided at an intermediate position of the upper rail 40 in the longitudinal direction thereof. The engagement protrusion bores 49a to 49c are arranged side by side in the longitudinal direction. An interval between the engagement protrusion bores 49a to 49c is substantially the same as an interval between the aforementioned plural lock bores 33a. Each of the engagement protrusion bores 49a to 49c penetrates through the upper rail 40. In addition, each of the engagement protrusion bores 49a to 49c is formed substantially in a rectangular shape extending along the height direction of the upper rail 40 and slightly curving. The engagement protrusion bores 49a to 49c are formed from each of the side wall portions 44a, 44b to a portion of the connection wall portion 45. The engagement protrusion bores 49a to 49c correspond to first receiving bores.

Further, plural (for example, three) fit-in grooves 46a are formed at an upper end of each of the folded wall portions 46. The plural fit-in grooves 46a are arranged at the upper rail 40 in the longitudinal direction thereof so as to correspond to the plural engagement protrusion bores 49a to 49c. Each of the fit-in grooves 46a penetrates through the upper rail 40 in the width direction W and opens upwards. The fit-in grooves 46a and the engagement protrusion bores 49a to 49c are arranged to correspond to the plural (for example, three) lock bores 33a of the lower rail 30 adjacent to one another.

Shaft receiving bores 47 penetrating through the upper rail 40 are provided at the side wall portions 44a and 44b, respectively, of the upper rail 40. The shaft receiving bores 47 correspond to second receiving bores. The two shaft receiving bores 47 are formed at positions closer to the release handle 60 relative to the engagement protrusion bores 49a to 49c.

As illustrated in FIG. 4, each of the shaft receiving bores 47 is formed in a substantially trapezoidal shape so that a bore width Wh2 decreases towards the vehicle floor 2. That is, the shaft receiving bore 47 includes two shaft side surfaces 47a and 47b facing each other in the longitudinal direction of the upper rail 40. A distance between the shaft side surfaces 47a and 47b decreases towards the vehicle floor 2.

Angles formed by the two shaft side surfaces 47a and 47b intersecting a center line Q of the shaft receiving bore 47 which extends in the height direction H, i.e., height direction of the upper rail 40, are defined to be shaft portion pressure angles θb1 and θb2. In the present embodiment, the shaft portion pressure angle θb2 is an angle obtained by rotating relative to the center line Q of the shaft receiving bore 47 by a predetermined angle in the clockwise direction. The shaft portion pressure angle θb1 is an angle obtained by rotating relative to the center line Q of the shaft receiving bore 47 by a predetermined angle in the counterclockwise direction. The shaft portion pressure angles θb1 and θb2 are specified to be the same values and specified to be greater than the teeth portion pressure angles θa1 and θa2.

As illustrated in FIG. 1, spring holding bores 48 are formed at a boundary portion between the side wall portion 44a and the connection wall portion 45 of the upper rail 40 and a boundary portion between the side wall portion 44b and the connection wall portion 45 of the upper rail 40, respectively. The two spring holding bores 38 are provided at positions closer to the release handle 60 relative to the shaft receiving bores 47.

Figure 8A:
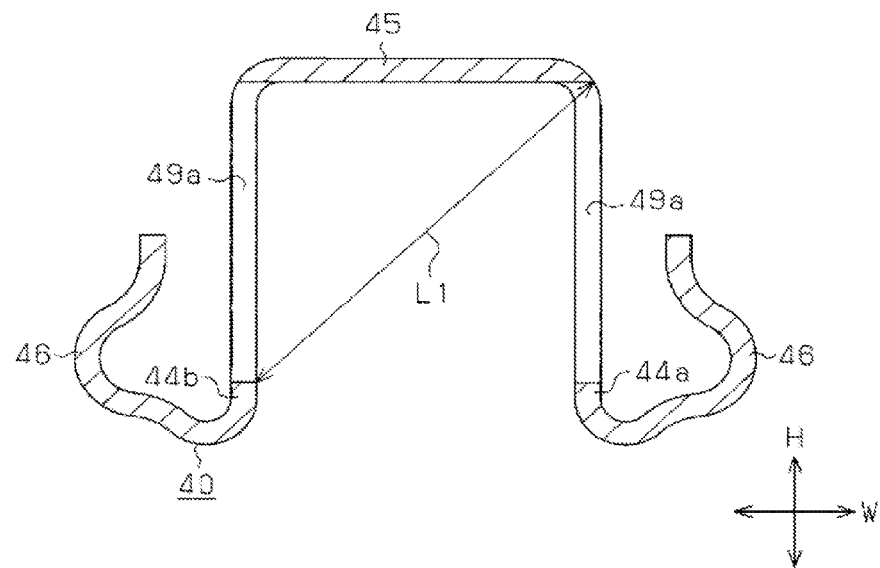
FIG. 8A is an enlarged cross-section view of an upper rail on a line 8A-8A in FIG. 1.

As illustrated in FIG. 8A, a length of a line connecting a first end portion at the engagement protrusion bore 49a of the second side wall portion 44b of the upper rail 40, specifically, a lower right inner angle portion at the engagement protrusion bore 49a, and a second end portion at the engagement protrusion bore 49a of the first side wall portion 44a, specifically, an upper left outer angle portion at the engagement protrusion bore 49a, is defined to be a protrusion allowable length L1. The protrusion allowable length L1 is a length necessary for inserting engagement protrusions 22aR to 22cR and 22aL to 22cL, which are explained later, into the respective engagement protrusion bores 49a while the engagement member 20 is rotated about a center axis along the longitudinal direction L. Protrusion allowable lengths for the other engagement protrusion bores 49b and 49c are greater than the protrusion allowable length L1 of the engagement protrusion bore 49a.

Figure 9A:
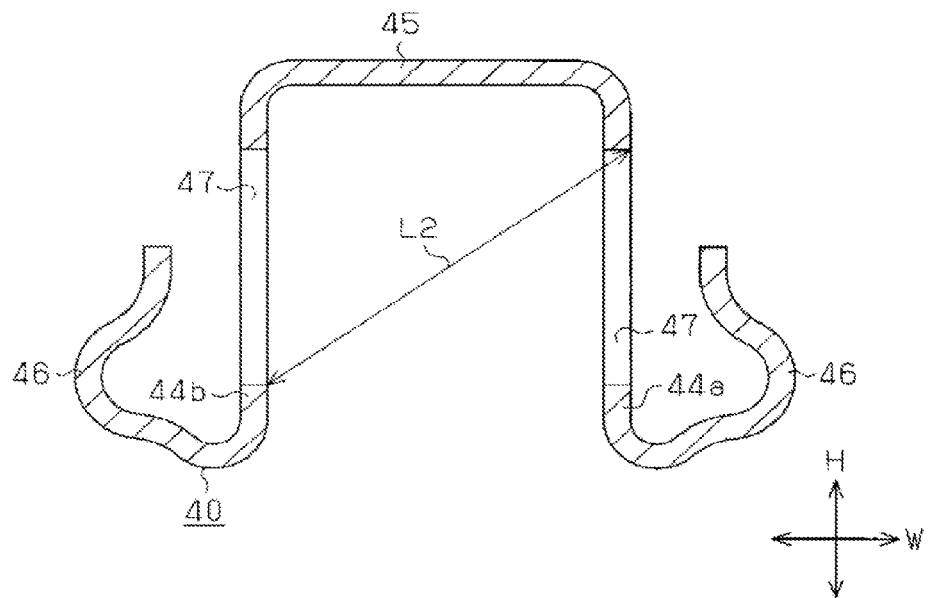
FIG. 9A is an enlarged cross-section view of the upper rail on a line 9A-9A in FIG. 1.

As illustrated in FIG. 9A, a length of a line connecting a first end portion at the shaft receiving bore 47 of the second side wall portion 44b of the upper rail 40, specifically, a lower right inner angle portion at the shaft receiving bore 47, and a second end portion at the shaft receiving bore 47 of the first side wall portion 44a, specifically, an upper right outer angle portion at the shaft receiving bore 47, is defined to be a shaft allowable length L2. The protrusion allowable length L2 is a length necessary for inserting plural rotary shaft portions 26R and 26L, which are explained later, into the respective shaft receiving bores 47 while the engagement member 20 is rotated about the center axis along the longitudinal direction L.

[Rolling Member]

As illustrated in FIG. 3, rolling members 16 are provided between the respective folded wall portions 46 of the upper rail 40 and the side wall portions 31 of the lower rail 30, the respective folded wall portions 46 facing the side wall portions 31. The upper rail 40 moves relative to the lower rail 30 along the longitudinal direction thereof while rolling the rolling members 16 relative to the lower rail 30.

[Engagement Member]

As illustrated in FIG. 1, the engagement member 20 is disposed within an inner void formed between the lower rail 30 and the upper rail 40 so as to extend along the longitudinal direction of the lower rail 30.

Figure 5:
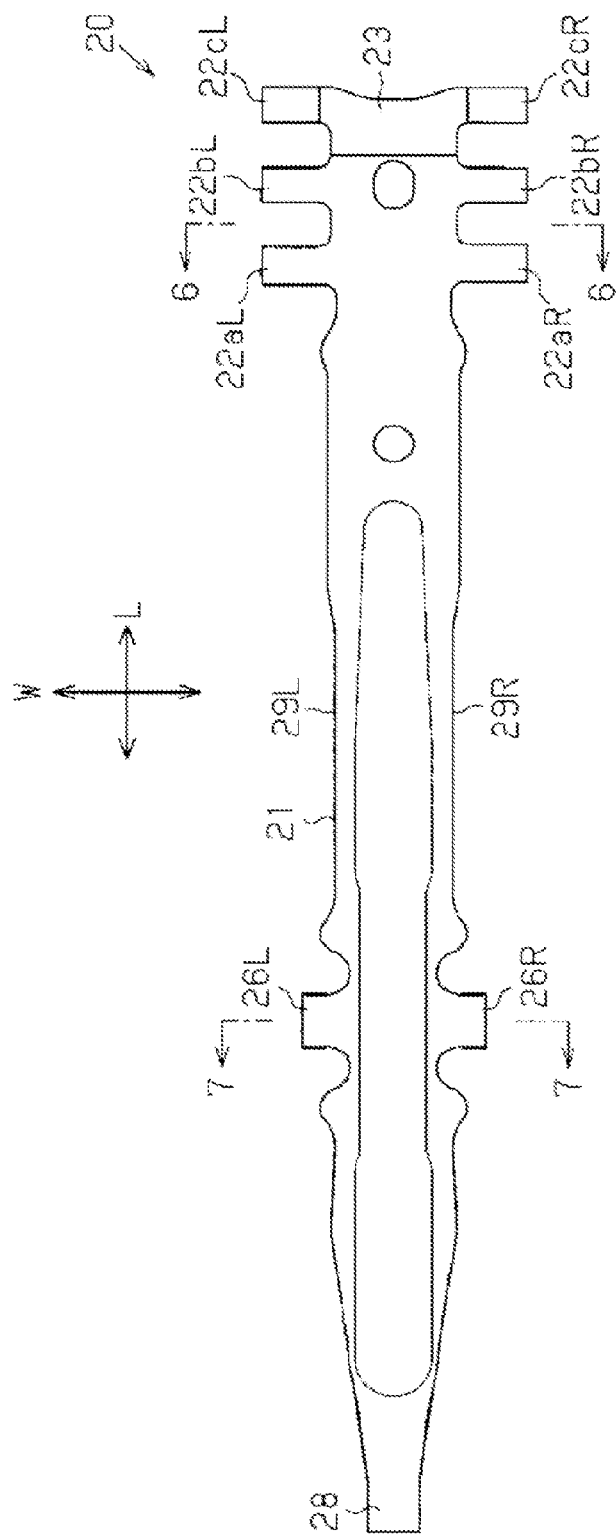
FIG. 5 is a top view of an engagement member in FIG. 1.

As illustrated in FIG. 5, a body portion 21, two groups of engagement protrusions 22aR to 22cR, 22aL to 22cL, a pair of rotary shaft portions 26R, 26L and an input portion 28 are integrally formed at the engagement member 20. The engagement member 20 is manufactured by press-working on a metallic plate.

The body portion 21 is formed in a substantially rectangular flat plate extending in a longitudinal direction thereof. The body portion 21 includes first and second side surfaces 29L and 29R extending in the longitudinal direction, and a tip end portion 23 positioned away from the release handle 60. Each of the engagement protrusions 22aR to 22cR and 22aL to 22cL is formed at the tip end portion 23 of the body portion 21 so as to protrude in a square bar form along the width direction. The three engagement protrusions 22aR to 22cR are formed at the first side surface 29R of the tip end portion 23 and the three engagement protrusions 22aL to 22cL are formed at the second side surface 29L of the tip end portion 23. The engagement protrusions 22aR to 22cR and the engagement protrusions 22aL to 22cL are disposed along the longitudinal direction of the body portion 21 at the same intervals as the lock bores 33a of the aforementioned lower rail 30.

Figure 6:
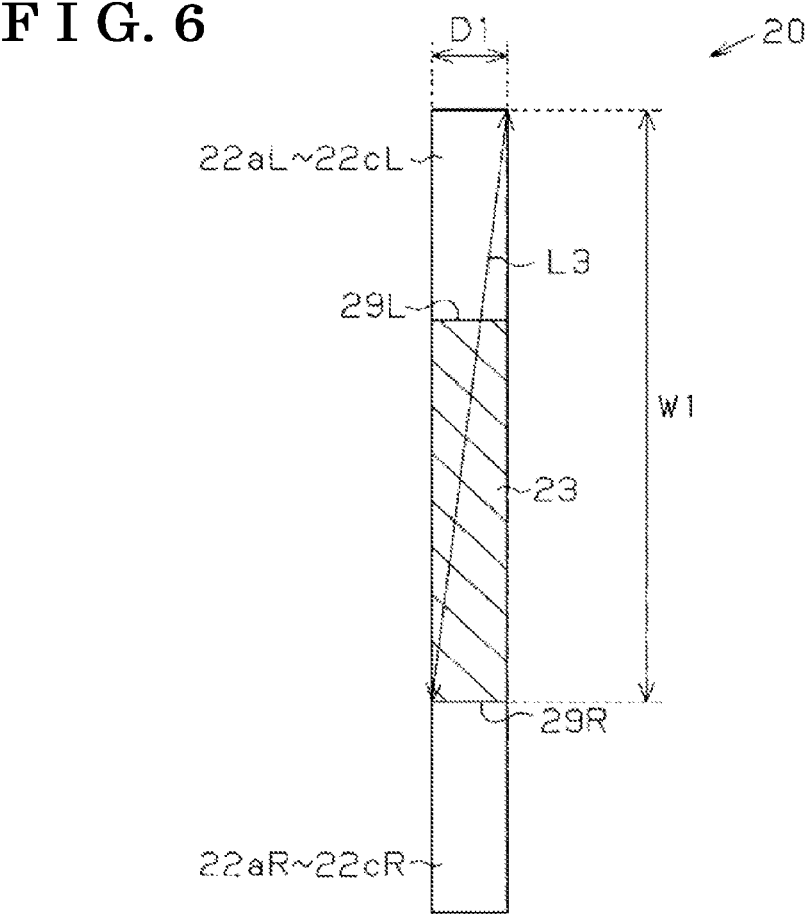
FIG. 6 is a cross-sectional view taken along a line 6-6 in FIG. 5.

As illustrated in FIG. 6, a protrusion maximum rotation length L3 is defined by a length of a diagonal line in a rectangular cross-section formed by the tip end portion 23 and the engagement protrusions 22aL to 22cL when viewed in the longitudinal direction of the body portion 21. In the present embodiment, the protrusion maximum rotation length L3 is the length of the diagonal line connecting a lower left angle portion of the tip end portion 23 and an upper right angle portion of the engagement protrusion 22a in the aforementioned rectangle in FIG. 6. In a case where the protrusion allowable length L1 is greater than the protrusion maximum rotation length L3, the engagement protrusions 22aR to 22cR and 22aL to 22cL are insertable to the engagement protrusion bores 49a to 49c. A detailed assembly method is explained later. The input portion 28 is provided at an opposite end portion of the body portion 21 from the tip end portion 23.

As illustrated in FIG. 5, the rotary shaft portions 26R and 26L of the engagement member 20 are arranged at the respective side surfaces 29R and 29L of the body portion 21 between the engagement protrusions 22aR to 22cR, 22aL to 22cL and the input portion 28. As illustrated in FIG. 4, each of the rotary shaft portions 26R and 26L is formed in a plate form curving towards the vehicle floor 2 from each of the side surfaces 29R and 29L of the body portion 21 in a state where a tip end surface 26a of each of the rotary shaft portions 26R and 26L extends along the longitudinal direction of the upper rail 40. The rotary shaft portions 26R and 26L face each other in the width direction thereof at a lower side of the body portion 21.

As illustrated in FIG. 4, the tip end surface 26a of each of the rotary shaft portions 26R and 26L includes two curved surfaces 26b formed at respective end sides in the longitudinal direction of the body portion 21 and a flat surface 26c extending in the longitudinal direction of the body portion 21 between the two curved surfaces 26b. As illustrated by an alternate long and two short dashes line in FIG. 4, the curved surfaces 26b are formed along a single circular arc depicted with reference to a rotation center O1 of the engagement member 20. The flat surface 26c is formed by removing a portion of the circular arc close to the vehicle floor 2 along the longitudinal direction of the body portion 21.

The curved surfaces 26b of each of the rotary shaft portions 26R and 26L make contact with two shaft side surfaces 47a and 47b of the shaft receiving bore 47 via two points P1 and P2. Thus, even if assembly accuracy between the shaft receiving bore 47 and each of the rotary shaft portions 26R, 26L decreases due to a manufacturing error of the upper rail 40 or the engagement member 20, for example, the engagement member 20 is supported by the two points P1 and P2 via which the first rotary shaft portion 26R and the first shaft receiving bore 47 make contact and by one point or two points via which the second rotary shaft portion 26L and the second shaft receiving bore 47 make contact. Accordingly, looseness of the engagement member 20 within the upper rail 40 may be restrained.

Figure 7:
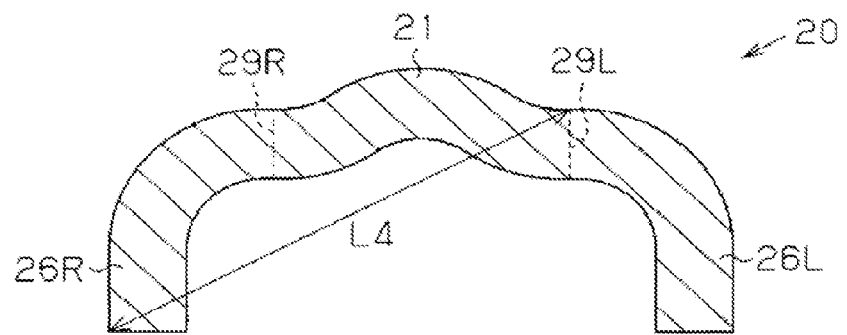
FIG. 7 is a cross-sectional view taken along a line 7-7 in FIG. 5.

As illustrated in FIG. 7, a shaft maximum rotation length L4 is defined by a maximum length of a line among lines connecting vertexes of external configurations of the body portion 21 and the first rotary shaft portion 26R when viewed in the longitudinal direction of the body portion 21. In the present embodiment, the shaft maximum rotation length L4 is a line connecting a tip end of the first rotary shaft portion 26R, specifically, a lower left angle portion of the first rotary shaft portion 26R and an upper portion of the second side surface 29L.

In a case where the maximum rotation length L4 is smaller than the aforementioned shaft allowable length L2, the rotary shaft portions 26R and 26L can be assembled on the respective shaft receiving bores 47 as explained later. A detailed assembly method is explained later.

As illustrated in FIG. 4, the rotary shaft portions 26R and 26L are inserted to be positioned within the respective shaft receiving bores 47. Each of the tip end surfaces 26a of the rotary shaft portions 26R and 26L, specifically, the curved surfaces 26b are in contact with the shaft side surfaces 47a and 47b facing each other in the longitudinal direction L of the shaft receiving bore 47. Then, the curved surfaces 26b roll on the respective shaft side surfaces 47a and 47b of each of the shaft receiving bores 47. Accordingly, the engagement member 20 is rotatable with reference to the rotary shaft portions 26R and 26L, i.e., about the rotation center O1. With the rotation of the engagement member 20, the engagement protrusions 22aR to 22cR and 22aL to 22cL of the engagement member 20 are movable between an engagement position at which the engagement protrusions 22aR to 22cR and 22aL to 22cL fit to the lock bores 33a of the lower rail 30 and a release position at which the engagement protrusions 22aR to 22cR and 22aL to 22cL disengage from the lock bores 33a.

[Spring]

As illustrated in FIG. 1, the spring 50 is configured by a single wire rod and is formed in a substantially U-shape. In addition, the spring 50 is positioned at an upper surface of the engagement member 20 facing the connection wall portion 45 of the upper rail 40 at the inner void formed between the lower rail 30 and the upper rail 40.

The spring 50 includes two holding portions 51, two biasing portions 52, two contact portions 53 and four run-off portions 54. In the spring 50, the holding portions 51, the biasing portions 52, the contact portions 53 and the run-off portions 54 are arranged in a line symmetry relative to a center line of the spring 50 along a longitudinal direction thereof. The spring 50 is formed to be elastically deformable in a direction where the portions in the spring 50 come closer to one another or separate from one another.

Each of the holding portions 51 is positioned at substantially a center in the longitudinal direction of the spring 50 and is formed substantially in a U-shape so as to protrude outward in the width direction W. That is, each of the holding portions 51 is formed in a semicircle including a specific radius. Each of the holding portions 51 is inserted to each of the spring holding bores 48 from the inner side of the upper rail 40. Accordingly, the spring 50 is held within the upper rail 40. FIG. 1 illustrates the configuration of the spring 50 in a case where the spring 50 is held within the upper rail 40.

Each of the biasing portions 52 is formed at a tip end of the spring 50. The biasing portions 52 bias the tip end portion 23 of the engagement member 20 downward, i.e., towards the vehicle floor 2 in a case where the spring 50 is disposed between the upper rail 40 and the engagement member 20. Each of the contact portions 53 is disposed at a position closer to each of the biasing portions 52 than each of the holding portions 51. In addition, the contact portion 53 is positioned most outward in the width direction of the spring 50 at a portion extending from the holding portion 51 to the biasing portion 52 in the spring 50. Thus, in a case where the spring 50 is positioned within the upper rail 40, each of the contact portions 53 makes contact, by its biasing force, with each of the side wall portions 44a and 44b. Because of the aforementioned biasing force, the position of the spring 50 in the width direction within the upper rail 40 is determined. In addition, the contact portions 53 are disposed at positions close to the engagement protrusions 22aR to 22cR and 22aL to 22cL, and the biasing portions 52 are arranged at desired positions relative to the upper surface of the engagement member 20.

The four run-off portions 54 are arranged at opposed ends of the two holding portions 51 in the longitudinal direction of the spring 50 so that the wire rod of the spring 50 is dent inward. Each of the run-off portions 54 restrains a base end of each of the holding portions 51 from making contact with a peripheral edge portion of each of the spring holding bores 48 in a case where the holding portion 51 is inserted to be positioned within the spring holding bore 48. For example, in a construction not including the run-off portions 54, when the base end of the holding portion 51 makes contact with the peripheral edge portion of the spring holding bore 48, positions or postures of the contact portions 53 and the biasing portions 52 may be dislocated relative to the engagement member 20. In this case, because the run-off portions 54 are provided, the contact portions 53 and the biasing portions 52 are held at desired positions or postures within the upper rail 40. Accordingly, the spring 50 may appropriately apply the biasing force to the engagement member 20.

[Adjustment of Seat Position]

Next, an operation in a case where the position of the seat 5 is adjusted by the seat slide device 1 for the vehicle is explained.

When an operation force is not added to the release handle 60, the engagement protrusions 22aR to 22cR, 22aL to 22cL of the engagement member 20 are held within the lock bores 33a of the lower rail 30 by the biasing force of the spring 50. Thus, the movement of the upper rail 40 relative to the lower rail 30 is restricted.

When an operator pulls the release handle 60, a tip end portion 61 of the release handle 60 pushes the input portion 28 of the engagement member 20 towards the vehicle floor 2. Accordingly, a force in a counterclockwise direction in FIG. 4 about the rotary shaft portions 26R and 26L of the engagement member 20 is added to the spring 50 and the engagement member 20. In a case where a force applied to the input portion 28 of the engagement member 20 exceeds the biasing force of the spring 50 added to the engagement member 20, the engagement protrusions 22aR to 22cR and 22aL to 22cL separate from the lower rail 30 to disengage from the lock bores 33a. At this time, the movement of the upper rail 40 relative to the lower rail 30 is permitted. The position of the seat 5 in the vehicle front-rear direction is thus adjustable.

[Assembly of Engagement Member 20 on Upper Rail 40]

In order to assemble the engagement member 20 on the upper rail 40, it is necessary that the engagement protrusions 22aR to 22cR and 22aL to 22cL are inserted to the engagement protrusion bores 49a to 49c, respectively, and thereafter the rotary shaft portions 26R and 26L are inserted to the respective shaft receiving bores 47.

Figure 8B:
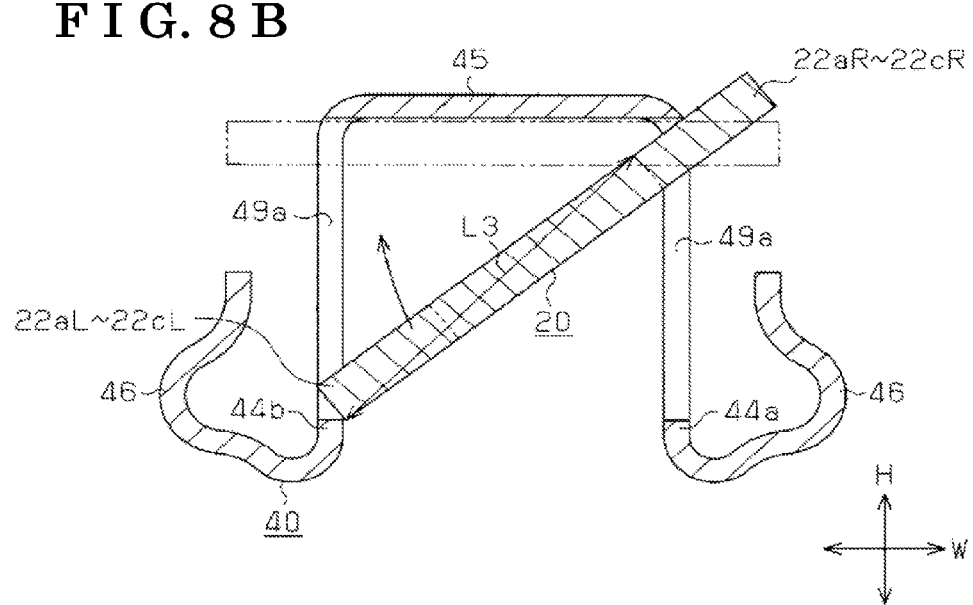
FIG. 8B is an enlarged cross-section view of the upper rail in a case where an engagement protrusion in FIG. 1 is inserted to an engagement protrusion bore.

Here, first, an operation in a case where the engagement protrusions 22aR to 22cR and 22aL to 22cL are inserted to the engagement protrusion bores 49a to 49c is explained. As illustrated in FIG. 8B, the first engagement protrusion 22aR to 22cR is inserted from the inner side of the upper rail 40 to a top portion of the engagement protrusion bore 49a of the first side wall portion 44a. At this time, the engagement member 20 is positioned to incline within the upper rail 40. After the insertion is completed, the engagement member 20 is rotated in the clockwise direction in FIG. 8B with reference to the first engagement protrusion 22aR to 22cR as a support point as indicated by an arrow in FIG. 8B so that the second engagement protrusion 22aL to 22cL is inserted to the engagement protrusion bore 49a of the second side wall portion 44b. The protrusion allowable length L1 is specified to be greater than the protrusion maximum rotation length L3. Thus, the second engagement protrusion 22aL to 22cL is inhibited from making contact with a lower edge portion of the engagement protrusion bore 49a at the second side wall portion 44b, so that the second engagement protrusion 22aL to 22cL is insertable into the engagement protrusion bore 49a.

For example, in a case where the protrusion allowable length L1 is equal to or smaller than the protrusion maximum rotation length L3, the tip end of the engagement protrusion 22aL to 22cL of the second side surface 29L makes contact with the lower edge portion of the upper rail 40 at a lower side than the engagement protrusion bore 49a of the second side wall portion 44b when the engagement member 20 is rotated in the clockwise direction in FIG. 8. Thus, the engagement member 20 is impossible to be assembled on the upper rail 40.

Figure 9B:
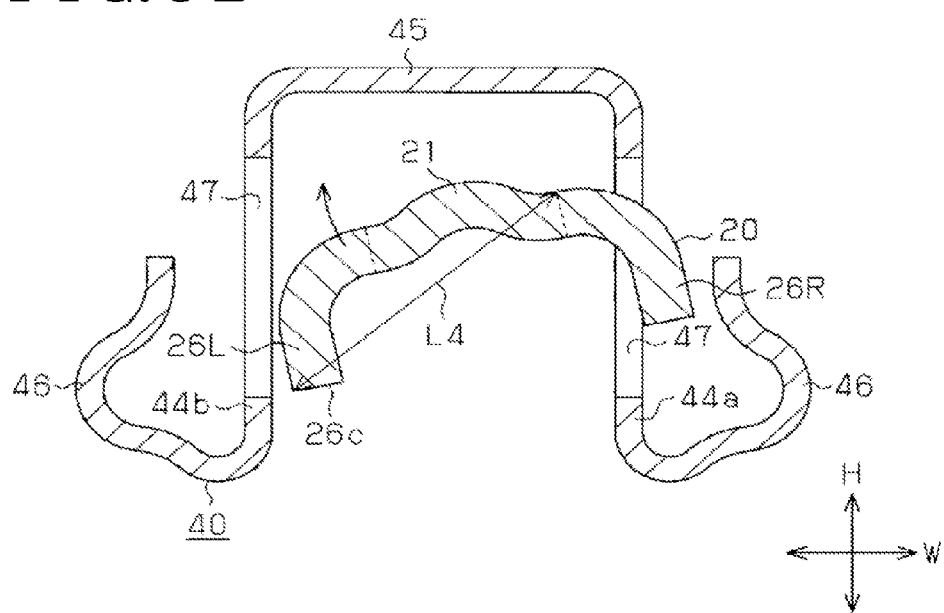
FIG. 9B is an enlarged cross-section view of the upper rail in a case where a rotary shaft portion in FIG. 1 is inserted to a shaft receiving bore.

Next, an operation in a case where the rotary shaft portions 26R and 26L are inserted to the respective shaft receiving bores 47 is explained. As illustrated in FIG. 9B, first, the first rotary shaft portion 26R is inserted to the shaft receiving bore 47 of the first side wall portion 44a from the inner side of the upper rail 40. At this time, the engagement member 20 is positioned to incline within the upper rail 40. After the insertion is completed, the engagement member 20 is rotated in the clockwise direction in FIG. 9B with reference to the first rotary shaft portion 26R as a support point as indicated by an arrow in FIG. 9B so that the second rotary shaft portion 26L is inserted to the shaft receiving bore 47 of the second side wall portion 44b.

At this time, because the shaft allowable length L2 is specified to be greater than the shaft maximum rotation length L4, the second rotary shaft portion 26L is inhibited from making contact with the lower edge portion of the upper rail 40 at a lower side than the shaft receiving bore 47 of the second side wall portion 44b. The rotary shaft portion 26L is insertable into the shaft receiving bore 47 accordingly.

For example, in a case where the shaft allowable length L2 is equal to or smaller than the shaft maximum rotation length L4, the second rotary shaft portion 26L makes contact with the lower edge portion of the upper rail 40 at a lower side than the shaft receiving bore 47 of the second side wall portion 44b when the engagement member 20 is rotated in the clockwise direction in FIG. 9B. Thus, the engagement member 20 is impossible to be assembled on the upper rail 40.

The rotary shaft portions 26R and 26L may be press-fitted to the respective shaft receiving bores 47 of the upper rail 40 by a method as below. Specifically, an external force is applied to the rotary shaft portions 26R and 26L in a direction where the rotary shaft portions 26R and 26L come closer to each other. Because of the aforementioned external force, the engagement member 20 is compressed in the width direction thereof so that the engagement member 20 is insertable into the upper rail 40. Accordingly, the rotary shaft portions 26R and 26L may be inserted into the shaft receiving bores 47 of the upper rail 40. The rotary shaft portions 26R and 26L include configurations to be easily deformed in the width direction as compared to the rotary shaft portion in a column form disclosed in Patent document 1. Thus, by the aforementioned press-fitting, the rotary shaft portions 26R and 26L may be also easily inserted to the shaft receiving bores 47 of the upper rail 40.

[Operation when Impact is Added to Engagement Member 20]

Figure 10:
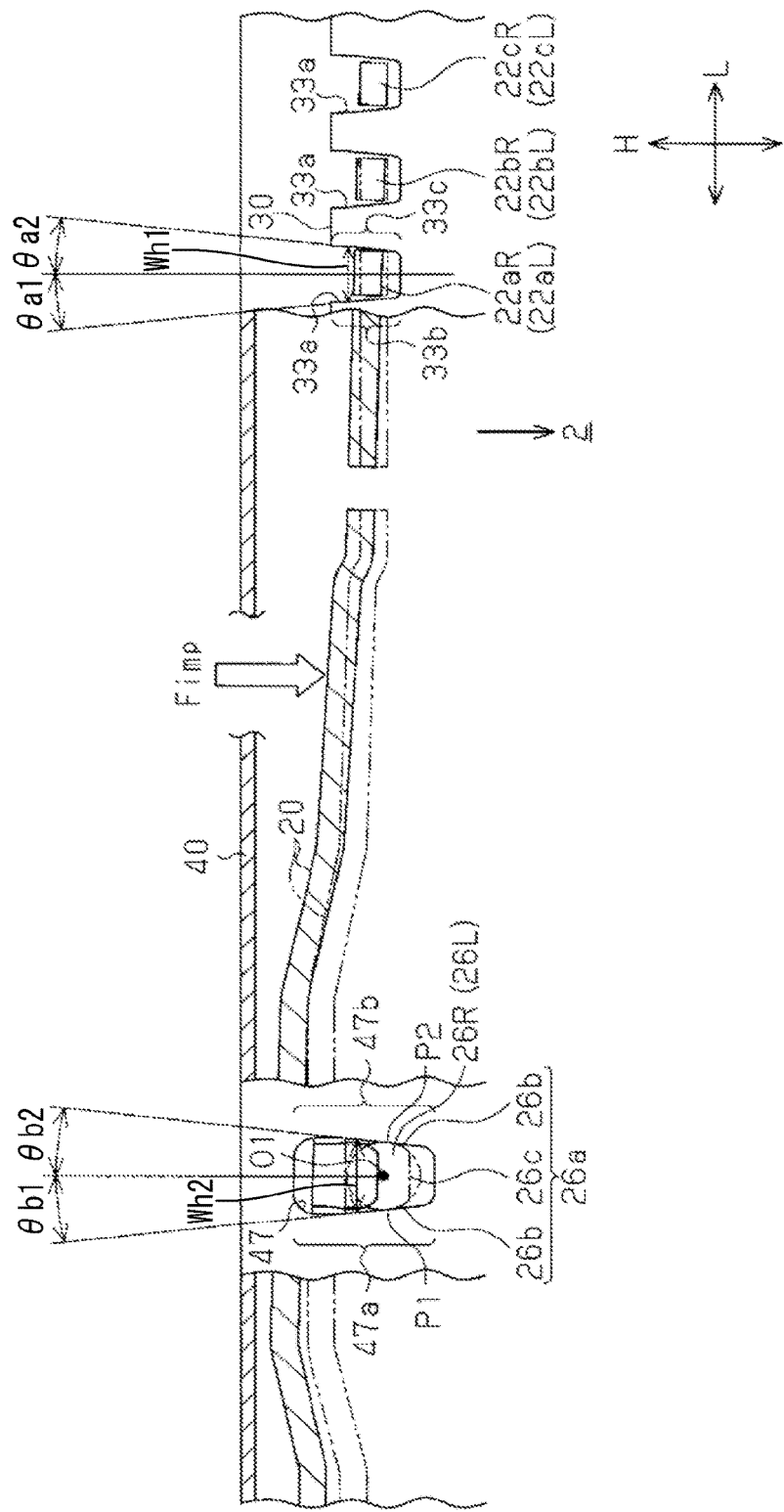
FIG. 10 is a cross-sectional view illustrating a state where an impact is applied to the engagement member illustrated in FIG. 4.

As illustrated in FIG. 10, a case where an impact force Fimp is applied to the engagement member 20 in a direction towards the vehicle floor 2 is assumed. With the impact force Fimp, each of the rotary shaft portions 26R and 26L receives a first reaction force from the shaft side surfaces 47a and 47b. In addition, each of the engagement protrusions 22aR to 22cR and 22aL to 22cL receives a second reaction force from the protrusion side surfaces 33b and 33c. Because the shaft portion pressure angles θb1 and θb2 are specified to be greater than the teeth portion pressure angles θa1 and θa2, the first reaction force is greater than the second reaction force. Thus, the rotary shaft portions 26R and 26L move upward within the respective shaft receiving bores 47 before the engagement protrusions 22aR to 22cR and 22aL to 22cL move. Thus, the engagement member 20 slightly rotates in the clockwise direction in FIG. 10 from a position indicated by an alternate long and two short dashes line in FIG. 10 to a position indicated by a solid line in FIG. 10. Accordingly, the engagement protrusions 22aR to 22cR and 22aL to 22cL move towards bottom surfaces of the respective lock bores 33a. Thus, the engagement protrusions 22aR to 22cR and 22aL to 22cL of the engagement member 20 are held at the engagement position at which the engagement protrusions 22aR to 22cR and 22aL to 22cL fit to the lock bores 33a of the lower rail 30.

According to the embodiment as explained above, the following effects are obtainable.

(1) In a case where the engagement member 20 is assembled on the upper rail 40, the first rotary shaft portion 26R is inserted to the shaft receiving bore 47 of the first side wall portion 44a from the inner side of the upper rail 40. After the aforementioned insertion, the engagement member 20 is rotated so that the second rotary shaft portion 26L is inserted to the shaft receiving bore 47 of the second side wall portion 44b. At this time, the shaft allowable length L2 is specified to be greater than the shaft maximum rotation length L4. Thus, the second rotary shaft portion 26L is inhibited from making contact with the edge portion of the shaft receiving bore 47 at the second side wall portion 44b. The insertion of the second rotary shaft portion 26L to the shaft receiving bore 47 is not interrupted. Thus, the second rotary shaft portion 26L is securely inserted into the shaft receiving bore 47 at the second side wall portion 44b so that the engagement member 20 may be easily assembled on the upper rail 40.

(2) In a case where the engagement member 20 is assembled on the upper rail 40, the engagement protrusions 22aR to 22cR of the first side surface 29R are inserted to the engagement protrusion bores 49a to 49c of the first side wall portion 44a from the inner side of the upper rail 40. After the aforementioned insertion, the engagement member 20 is rotated so that the engagement protrusions 22aL to 22cL of the second side surface 29L are inserted to the engagement protrusion bores 49a to 49c of the second side wall portion 44b. At this time, the protrusion allowable length L1 is specified to be greater than the protrusion maximum rotation length L3. Thus, the engagement protrusions 22aL to 22cL are inhibited from making contact with the edge portions of the engagement protrusion bores 49a to 49c at the second side wall portion 44b. The insertion of the engagement protrusions 22aL to 22cL is not interrupted. Accordingly, the engagement protrusions 22aL to 22cL are securely inserted into the engagement protrusion bores 49a to 49c at the second side wall portion 44b so that the engagement member 20 may be easily assembled on the upper rail 40.

(3) The rotary shaft portions 26R and 26L are formed to curve relative to the body portion 21 of the engagement member 20 as illustrated in FIG. 4. In addition, each of the tip end surfaces 26a of the rotary shaft portions 26R and 26L includes the curved surfaces 26b at the opposed ends so that the tip end surface 26a is rollable relative to the shaft side surfaces 47a and 47b of the shaft receiving bore 47. The rotary shaft portions 26R and 26L may be formed by press-working from a plate integral with the body portion 21 of the engagement member 20. Thus, the engagement member 20 including the rotary shaft portions 26R and 26L may be easily manufactured.

(4) The rotary shaft portions 26R and 26L are configured so that each of the semicircular tip end thereof when viewed in the width direction of the body portion 21 is removed along the longitudinal direction of the body portion 21. Thus, the aforementioned shaft maximum rotation length L4 may be reduced. The shaft allowable length L2 may be easily specified to be greater than the shaft maximum rotation length L4.

Each of the rotary shaft portions 26R and 26L functions as a rotary shaft by the two curved surfaces 26b. In this case, a simpler construction may be achieved while achieving the similar function to an imaginary different engagement member including a column-formed rotary shaft indicated by an alternate long and two short dashes line in FIG. 4.

(5) As illustrated in FIG. 4, the distance between the two shaft side surfaces 47a and 47b in contact with each of the rotary shaft portions 26R and 26L at the shaft receiving bore 47 decreases towards the vehicle floor 2. According to such construction, the respective curved surfaces 26b of each of the rotary shaft portions 26R and 26L make contact with the two shaft side surfaces 47a and 47b via the two points P1 and P2 at the shaft receiving bore 47. Thus, even in a case where the assembly accuracy between the shaft receiving bores 47 and the rotary shaft portions 26R, 26L decreases by the manufacture error of the upper rail 40 or the engagement member 20, for example, the engagement member 20 is supported at the two points P1 and P2 via which the first rotary shaft portion 26R makes contact with the shaft receiving bore 47, and one or two point(s) via which the second rotary shaft portion 26L makes contact with the shaft receiving bore 47 at the opposite side. Therefore, looseness of the engagement member 20 within the upper rail 40 may be restrained.

(6) As illustrated in FIG. 4, the shaft portion pressure angles θb1 and θb2 are specified to be greater than the teeth portion pressure angles θa1 and θa2. The greater the pressure angles θa1, θa2, θb1, θb2 of the side surfaces 33b, 33c, 47a, 47b are, the greater the forces applied to the side surfaces 33b, 33c, 47a, 47b from the engagement protrusions 22aR to 22cR, 22aL to 22cL or the rotary shaft portions 26R and 26L are. Accordingly, the reaction force received by the engagement protrusions 22aR to 22cR, 22aL to 22cL or the rotary shaft portions 26R and 26L becomes greater. Thus, even when the impact force Fimp is applied to the engagement member 20, for example, the reaction force received by the rotary shaft portions 26R and 26L is greater than the reaction force received by the engagement protrusions 22aR to 22cR, 22aL to 22cL because of the specification of the pressure angles in the aforementioned relationship. Thus, when the impact force Fimp is applied to the engagement member 20, the rotary shaft portions 26R and 26L first disengage from the respective shaft receiving bores 47 by the reaction force so that the engagement protrusions 22aR to 22cR and 22aL to 22cL are held within the lock bores 33a. Accordingly, the engagement protrusions 22aR to 22cR and 22aL to 22cL are restrained from inadvertently disengaging from the lock bores 33a and further the lower rail 30 is restrained from being movable relative to the upper rail 40.

(7) As illustrated in FIG. 4, the teeth portion pressure angles θa1 and θa2 formed by the two protrusion side surfaces 33b and 33c of each of the lock bores 33a are specified to be the same and the shaft portion pressure angles θb1 and θb2 formed by the two shaft side surfaces 47a and 47b of each of the shaft receiving bores 47 are specified to be the same. Accordingly, the configuration of each of the lock bore 33a and the shaft receiving bore 47 is in a line symmetry relative to each of the center lines P and Q of each of the lock bore 33a and the shaft receiving bore 47. Thus, the lock bores 33a and the shaft receiving bores 47 may be easily formed.

(8) While the first engagement protrusion 22aR to 22cR is in contact with an upper side end portion in FIG. 8B within the engagement protrusion bore 49a of the first side wall portion 44a, the engagement member 20 is rotated in the clockwise direction. At this time, the engagement protrusion bore 49a of the second side wall portion 44b is formed so that the second engagement protrusion 22aL to 22cL can enter to the engagement protrusion bore 49a. The engagement protrusion bore 49a of the first side wall portion 44a is also formed in the similar point of view. According to such construction, the engagement member 20 may be easily assembled on the upper rail 40.

Second Embodiment

Figure 11:
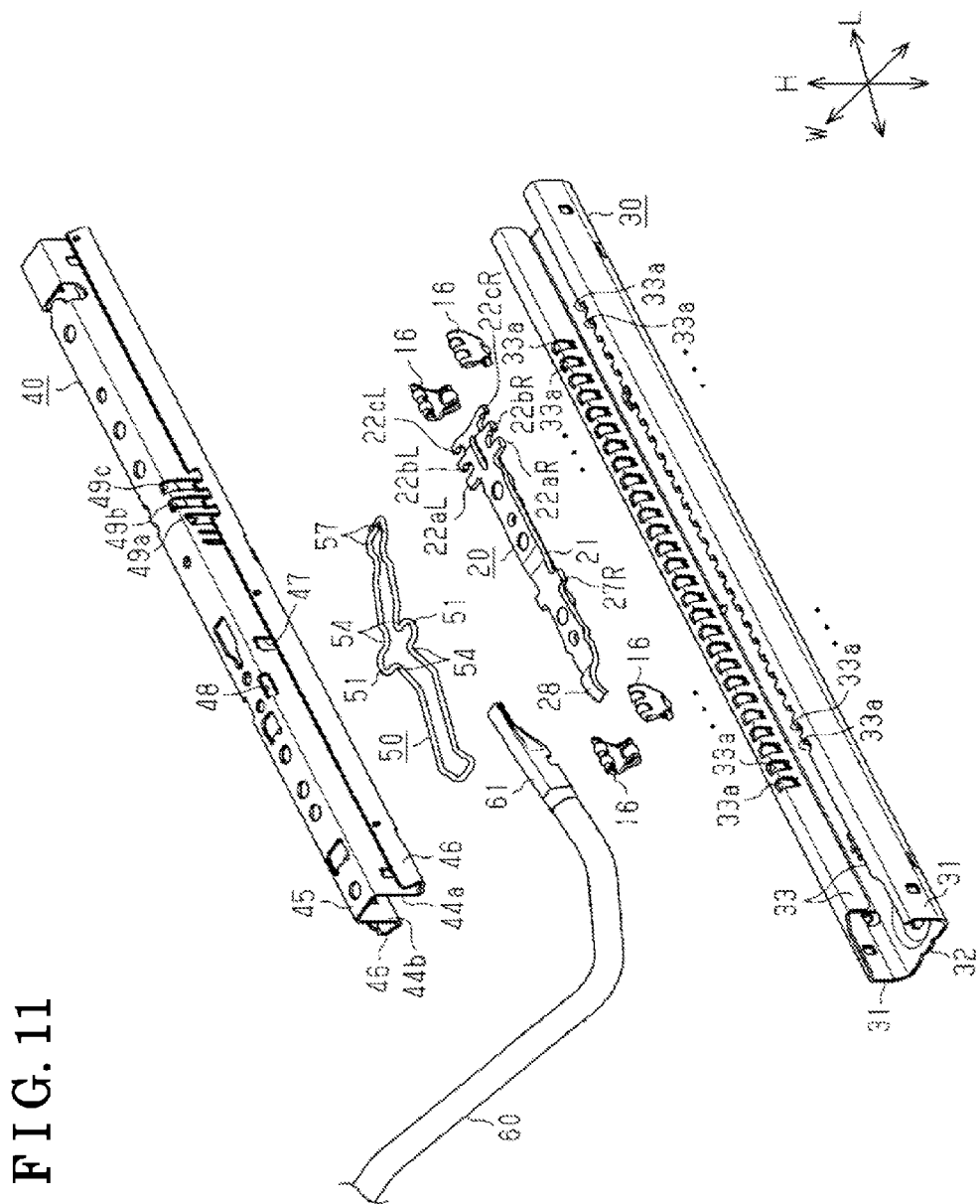
FIG. 11 is a perspective view illustrating a construction of a seat slide device according to a second embodiment.
Figure 12A:
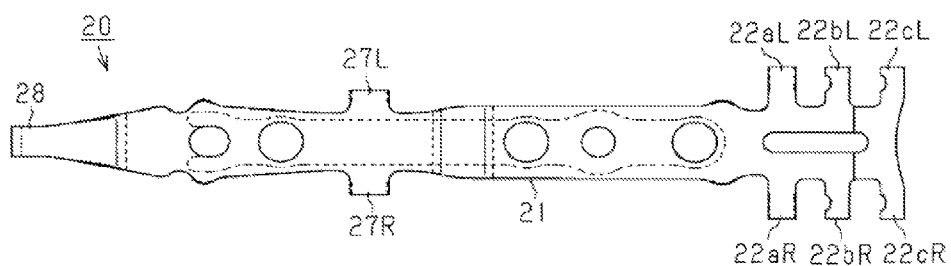
FIG. 12A is a plan view of the engagement member illustrated in FIG. 11.
Figure 12B:
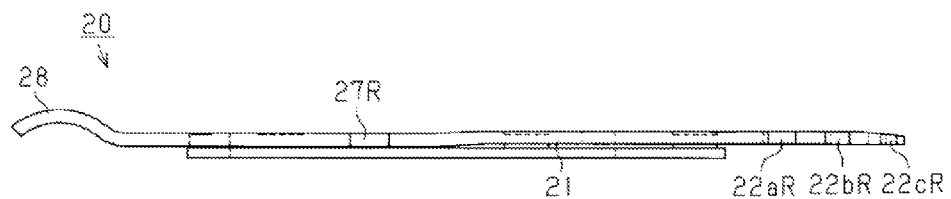
FIG. 12B is a side view of the engagement member illustrated in FIG. 11.
Figure 12C:
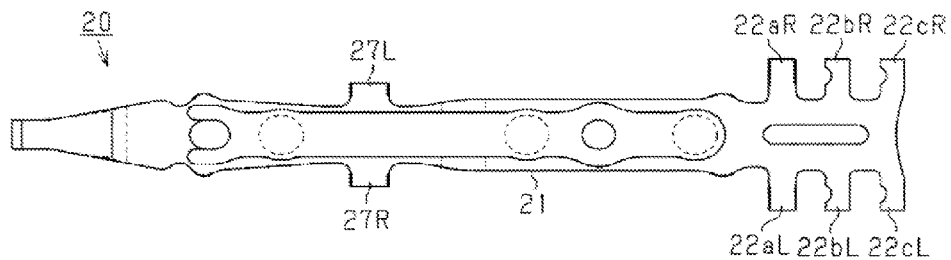
FIG. 12C is a bottom view of the engagement member illustrated in FIG. 11.
Figure 13A:
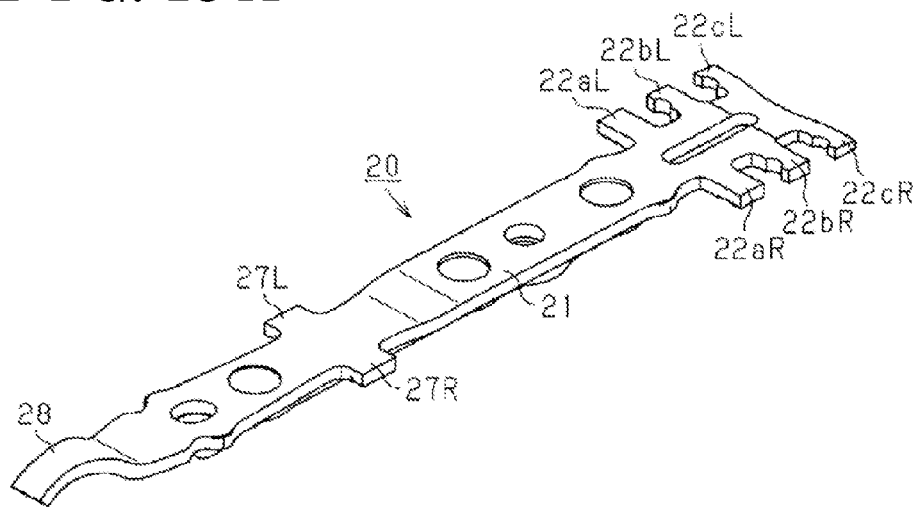
FIG. 13A is a top side perspective view in a state where the engagement member illustrated in FIG. 11 is viewed obliquely upward.
Figure 13B:
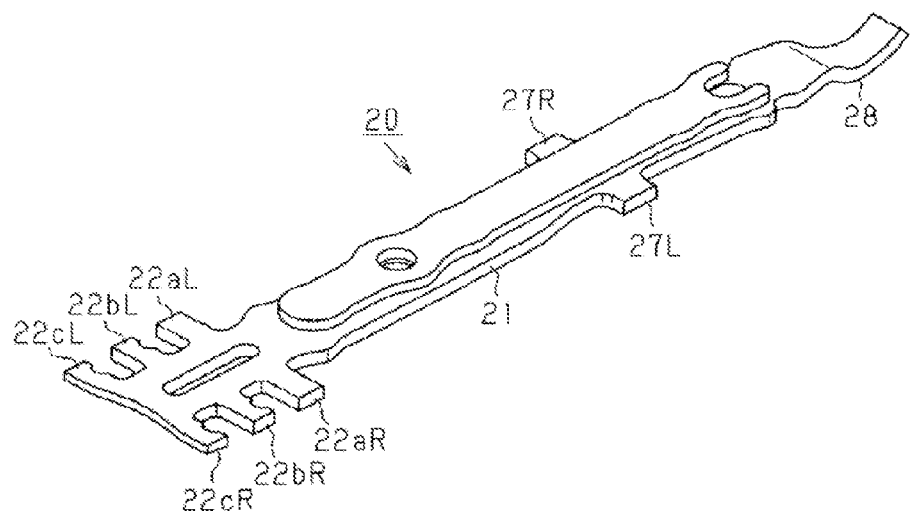
FIG. 13B is a down side perspective view in a state where the engagement member illustrated in FIG. 11 is viewed obliquely upward.

A second embodiment of the present invention is explained with reference to FIGS. 11 to 16. As illustrated in FIG. 11, the seat slide device 1 for the vehicle of the present embodiment includes substantially the same components as the first embodiment. The first embodiment differs from the second embodiment in, specifically, constructions of the engagement member and the spring.

Specifically, in the first embodiment, the rotary shaft portions 26R and 26L are curved. In the second embodiment, as illustrated in FIGS. 12A to 12C, 13A and 13B, each of rotary shaft portions 27R and 27L is formed in a rectangular flat plate extending in the longitudinal direction of the engagement member 20 and is coplanar relative to the body portion 21. The two rotary shaft portions 27R and 27L protrude in opposite directions from each other from the body portion 21.

Figure 14:
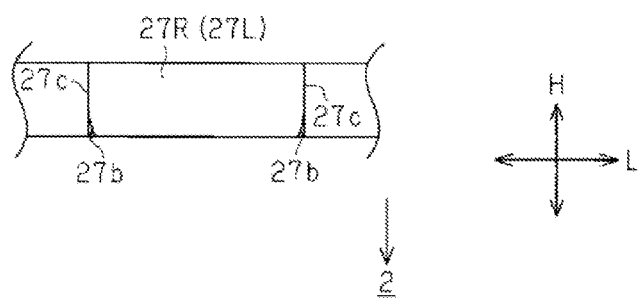
FIG. 14 is a partially enlarged view of the rotary shaft portion illustrated in FIG. 12B.

As illustrated in FIG. 14, each of the rotary shaft portions 27R and 27L includes a pair of side surfaces 27c protruding in the height direction of the body portion 21 when viewed in the with direction of the body portion 21. Each of the side surfaces 27c includes a curved surface 27b formed at an end portion close to the vehicle floor 2. The curved surface 27b curves to a center portion of each of the rotary shaft portions 27R and 27L towards the vehicle floor 2. In the similar manner to the first embodiment, the rotary shaft portions 26R and 26L are inserted to be positioned within the respective shaft receiving bores 47. At this time, the curved surfaces 27b are in contact with the respective shaft side surfaces 47b of the shaft receiving bore 47. Accordingly, the engagement member 20 of the second embodiment is also rotarably supported relative to the upper rail 40. The seat slide device 1 for the vehicle of the second embodiment operates in the similar manner to the first embodiment.

Figure 15A:
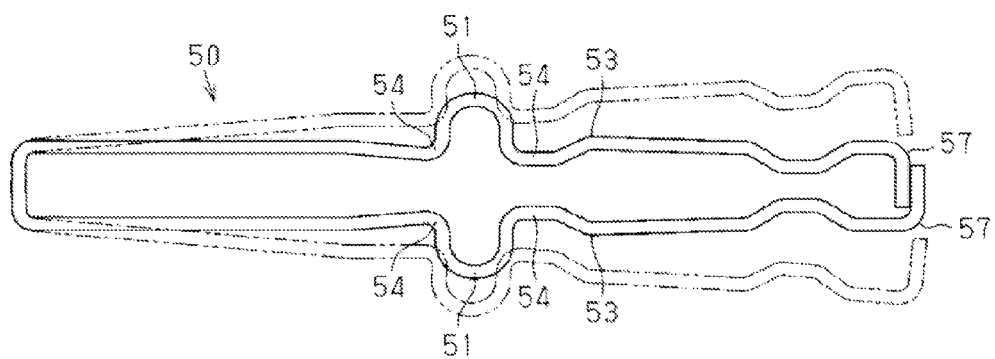
FIG. 15A is a top view of a spring illustrated in FIG. 11.
Figure 15B:
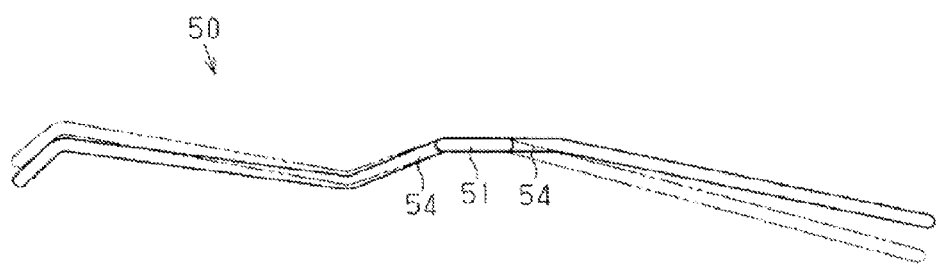
FIG. 15B is a side view of the spring illustrated in FIG. 11.
Figure 16:
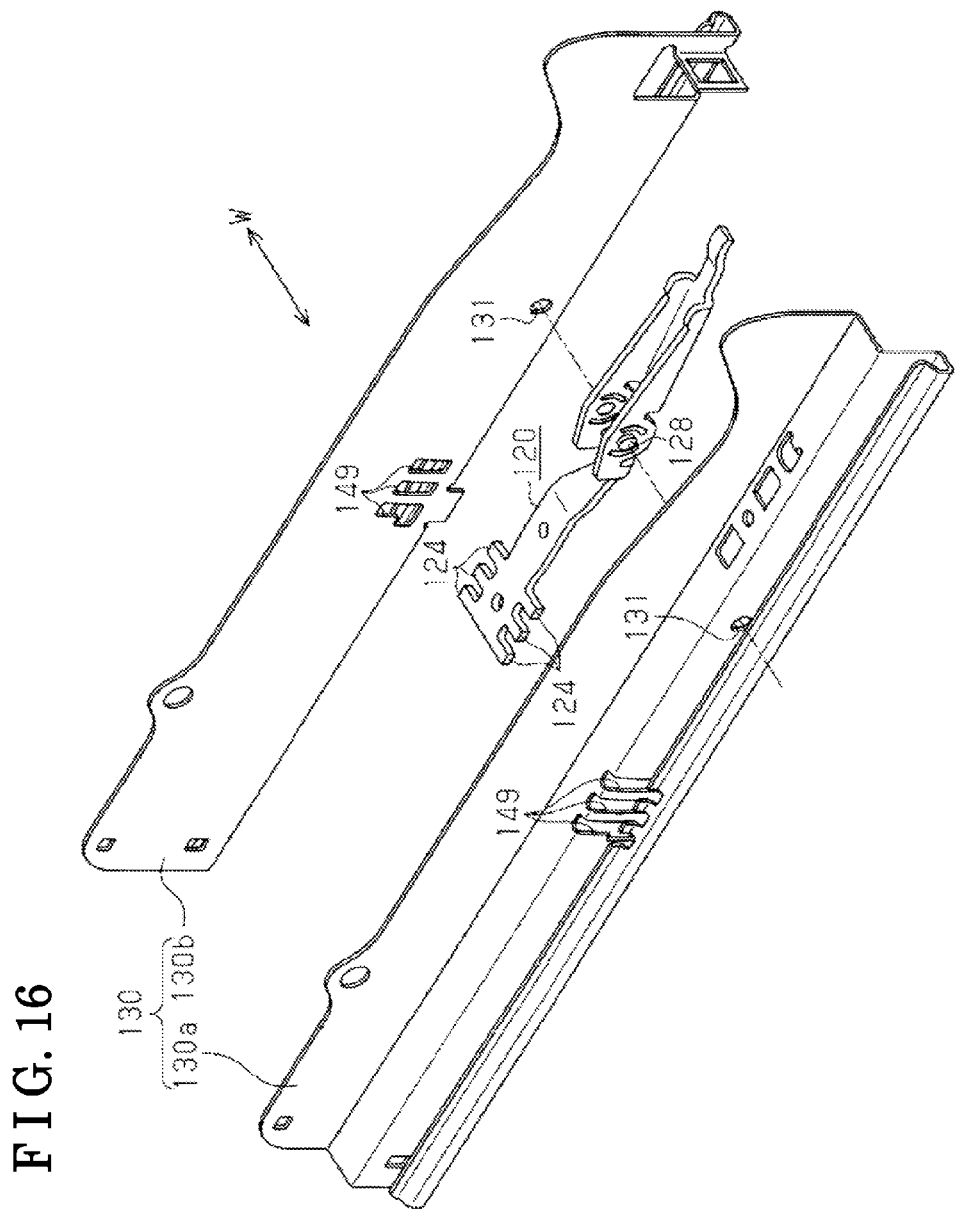
FIG. 16 is a perspective view of an upper rail and an engagement member according to a conventional art.

As illustrated in FIGS. 15A and 15B, in the second embodiment, the spring 50 includes a pair of distal ends 57 positioned at distal ends. Each of the distal ends 57 is folded inwardly in the width direction to extend at a substantially right angle relative to the longitudinal direction. In addition, the distal ends 57 are positioned adjoined to each other along the longitudinal direction of the spring 50.

According to the embodiment as explained above, the following operation and effect are obtained as compared to the first embodiment.

(9) In either embodiment, in a case where the impact force is applied along the vehicle front-rear direction L relative to the seat slide device 1 for the vehicle, each of the rotary shaft portions 26R, 26L, 27R and 27L receives the impact force at the lower side of the body portion 21 via the shaft side surfaces 47a and 47b of the shaft receiving bore 47. For example, in a case where the vehicle receives a rearward impact, each of the rotary shaft portions 26R and 26L receives the impact force in a leftward direction at the point P2 in FIG. 4 via the shaft side surface 47b. Because the engagement member 20 receives the impact force at the lower side of the body portion 21, a rotation moment is generated at the engagement member 20 in a direction where the input portion 28 of the engagement member 20 approaches the tip end portion 61 of the release handle 60. In the first embodiment, the aforementioned impact force is applied to the rotary shaft portions 26R and 26L positioned in the direction of the vehicle floor 2 relative to the body portion 21. In the second embodiment, the aforementioned impact force is applied to the rotary shaft portions 27R and 27L which are provided at the same position as the body portion 21 in the vehicle height direction H. A moment is known to increase when a point of application at which the impact force is applied comes closer to the vehicle floor 2 from the body portion 21. Thus, the moment applied to the engagement member 20 upon the aforementioned impact is smaller in the second embodiment than in the first embodiment. In the second embodiment, because the moment applied to the engagement member 20 in the event of the aforementioned impact is relatively small, the engagement member 20 is restrained from being deformed by the moment. Because the deformation of the engagement member 20 is restrained, an impact load in the vehicle front-rear direction may be securely received, thereby improving stability of holding a locked state when the impact force is applied.

(10) The pair of distal ends 57 of the spring 50 protrudes inward in the width direction W. In this case, the tip ends 57 are both linearly contactable with the engagement member 20. Thus, an arear where the spring 50 is in contact with the engagement member 20 increases. The engagement member 20 is thus held stably by the spring 50.

The aforementioned embodiments may be appropriately modified to be achieved as follows. In the second embodiment, each of the rotary shaft portions 27R and 27L is formed in the rectangular flat plate. Alternatively, for example, each of the rotary shaft portions 27R and 27L may be formed in a column extending in the width direction from the body portion 21.

In the first embodiment, each of the rotary shaft portions 26R and 26L is provided curving towards the vehicle floor 2 relative to the body portion 21 of the engagement member 20 in a state where the tip end surface 26a extends along the longitudinal direction. Alternatively, each of the rotary shaft portions 26R and 26L may be bent at substantially a right angle relative to the body portion 21 to be formed in a substantially L-shape.

In the first and second embodiments, it is configured that the lower rail 30 corresponding to the first rail is fixed to the vehicle floor 2 and the upper rail 40 corresponding to the second rail is movable relative to the lower rail 30. Alternatively, it may be configured that the second rail is fixed to the vehicle floor 2 and the first rail is movable relative to the lower rail 30.

The seat slide device 1 for the vehicle according to the first and second embodiments may be applied to other than the vehicle. The number of the engagement protrusions 22aR to 22cR and 22aL to 22cL of the engagement member 20 and the number of the engagement protrusion bores 49a to 49c according to the first and second embodiments may be appropriately changed.

In the first and second embodiments, the teeth portion pressure angles θa1 and θa2 formed by the two side surfaces 33b and 33c of the lock bore 33a are specified to be the same as each other and the shaft portion pressure angles θb1 and θb2 formed by the two side surfaces 47a and 47b of the shaft receiving bore 47 are specified to be the same as each other. Alternatively, the teeth portion pressure angles θa1 and θa2 may be specified to be different from each other and the shaft portion pressure angles θb1 and θb2 may be specified to be different from each other.

The value of each of the pressure angles θa2a1, θa2a2, θa2b1 and θa2b2 in the first and second embodiments may be appropriately changed. In the first and second embodiments, the flat surface portion 26c is formed at the tip end surface 26a of the rotary shaft portion 26. Alternatively, the flat surface portion 26c may be omitted and the tip end surface 26a of the rotary shaft portion 26 may be entirely formed in a curved surface form. In this case, the shaft receiving bore 47 may be formed in a column form.

The engagement member 20 in the first and second embodiments may be manufactured with a usage of casting, for example. In the first and second embodiments, the tip end surface 26a of each of the rotary shaft portions 26R and 26L includes the flat surface 26c formed between the two curved surfaces 26b. Alternatively, the flat surface 26c may be omitted. In this case, the tip end surface 26a may be formed in a single semicircle.

EXPLANATION OF REFERENCE NUMERALS

1: seat slide device for vehicle, 2: vehicle floor, 5: seat, 16: rolling member, 20: engagement member, 21: body portion, 22aL-22cL, 22aR-22cR: engagement protrusion, 23: tip end portion, 26: rotary shaft portion, 26a: tip end surface, 26b: curved surface, 26c: flat surface, 28: input portion, 30: lower rail serving as first rail, 31: side wall portion, 32: connection wall portion, 33: folded wall portion, 33a: lock bore, 40: upper rail serving as second rail, 44a: first side wall portion, 44b: second side wall portion, 45: connection wall portion, 46: folded wall portion, 46a: fit-in groove, 47: shaft receiving bore serving as second receiving bore, 48: spring holding bore, 49a-49c; engagement protrusion bore serving as first receiving bore, 50: spring, 51: holding portion, 52: biasing portion, 53: contact portion, 54: run-off portion, 60: release handle

The invention claimed is:

1. A seat slide device comprising:
a first rail;
a second rail connected to the first rail to be movable relative to the first rail along a longitudinal direction of the first rail; and
an engagement member rotatably supported within the second rail,
the second rail including first and second side wall portions facing each other in a width direction orthogonal to a longitudinal direction of the second rail,
each of the first and second side wall portions being provided with a first receiving bore and a second receiving bore, the first receiving bore and the second receiving bore into which respective portions of the engagement member are inserted,
the engagement member including:
a body portion;
first and second side surfaces extending in a longitudinal direction of the body portion;
engagement protrusions protruding from the first and second side surfaces to an outer side of the second rail via the first receiving bores respectively, the engagement protrusions moving between an engagement position at which the engagement protrusions engage with the first rail and a release position at which the engagement protrusions separate from the first rail depending on a rotation position of the engagement member;
a first rotary shaft portion provided at the first side surface of the body portion and inserted to be rotatably positioned within the second receiving bore of the first side wall portion of the second rail; and
a second rotary shaft portion provided at the second side surface of the body portion and inserted to be rotatably positioned within the second receiving bore of the second side wall portion of the second rail, wherein
a shaft allowable length is defined by a length of an imaginary line connecting a first end portion in a height direction orthogonal to the longitudinal direction and a width direction of the body portion at the second receiving bore of the first side wall portion and a second end portion in the height direction at the second receiving bore of the second side wall portion, the second end portion being provided at an opposite side from the first end portion,
a shaft maximum rotation length is defined by a length of an imaginary line connecting the second side surface of the body portion and a tip end of the first rotary shaft portion provided at the first side surface of the body portion,
the shaft allowable length is specified to be greater than the shaft maximum rotation length.

2. The seat slide device according to claim 1, wherein a protrusion allowable length is defined by a length of an imaginary line connecting a first end portion in the height direction at the first receiving bore of the first side wall portion and a second end portion in the height direction at the first receiving bore of the second side wall portion,
a protrusion maximum rotation length is defined by a length of an imaginary line connecting the first side surface of the body portion of the engagement member and a tip end of the engagement protrusion provided at the second side surface,
the protrusion allowable length is specified to be greater than the protrusion maximum rotation length.

3. The seat slide device according to claim 1, wherein the first rotary shaft portion and the second rotary shaft portion are provided curving relative to the body portion in a state facing each other in the width direction of the body portion,
at least a portion of each of the rotary shaft portions includes a curved surface so that a tip end surface of each of the rotary shaft portions is rollable along a side surface constituting the second receiving bore.

4. A seat slide device comprising:
a first rail;
a second rail connected to the first rail to be movable relative to the first rail along a longitudinal direction of the first rail; and
an engagement member rotatably supported within the second rail,
the second rail including first and second side wall portions facing each other in a width direction orthogonal to a longitudinal direction of the second rail,
each of the first and second side wall portions being provided with a first receiving bore and a second receiving bore, the first receiving bore and the second receiving bore into which respective portions of the engagement member are inserted,
the engagement member including:
a body portion;
first and second rotary shaft portions protruding from the body portion to opposed sides along a width direction thereof such that the first and second rotary shaft portions are coplanar relative to the body portion, at least a portion of each of the first and second rotary shaft portions including a curved surface so that a tip end surface of each of the first and second rotary shaft portions is rollable along a side surface constituting the second receiving bore; and
an engagement protrusion moving between an engagement position at which the engagement protrusion engages with the first rail and a release position at which the engagement protrusion separates from the first rail depending on a rotation position of the engagement member via the first and second rotary shaft portions.

5. The seat slide device according to claim 4, wherein the engagement member includes first and second side surfaces extending in a longitudinal direction of the body portion,
a shaft allowable length is defined by a length of an imaginary line connecting a first end portion in a height direction orthogonal to the longitudinal direction and the width direction of the body portion at the second receiving bore of the first side wall portion and a second end portion in the height direction at the second receiving bore of the second side wall portion, the second end portion being provided at an opposite side from the first end portion,
a shaft maximum rotation length is defined by a length of an imaginary line connecting the second side surface of the body portion and a tip end of the first rotary shaft portion provided at the first side surface of the body portion,
the shaft allowable length is specified to be greater than the shaft maximum rotation length.

6. The seat slide device according to claim 3, wherein the tip end surface of each of the rotary shaft portions includes a flat surface positioned at a tip end side of each of the rotary shaft portions in a height direction of the second receiving bore and provided along the longitudinal direction of the body portion and two curved surfaces provided at opposed sides of the flat surface in the longitudinal direction of the body portion and positioned on an identical imaginary arc when viewed in the width direction of the body portion, the two curved surfaces making contact in a rollable manner with two side surfaces of the second receiving bore facing each other in the longitudinal direction of the body portion.

7. The seat slide device according to claim 6, wherein a distance between the two side surfaces of the second receiving bore is specified to be smaller towards the first rail_along a height direction of the body portion.

8. A seat slide device comprising:
a first rail;
a second rail connected to the first rail to be movable relative to the first rail along a longitudinal direction of the first rail; and
an engagement member rotatably supported within the second rail,
the second rail including first and second side wall portions facing each other in a width direction orthogonal to the longitudinal direction of the first rail,
each of the first and second side wall portions being provided with a first receiving bore and a second receiving bore, the first receiving bore and the second receiving bore into which respective portions of the engagement member are inserted, the first rail being provided with a lock bore including two protrusion side surfaces facing each other, the engagement member including:
- a body portion;
- an engagement protrusion protruding to an outer side of the second rail along the width direction via each of the first receiving bores and moving between an engagement position at which the engagement protrusion is positioned between the two protrusion side surfaces of the lock bore at the first rail and a release position at which the engagement protrusion disengages from the lock bore depending on a rotation position of the engagement member; and
- first and second rotary shaft portions inserted to be rotatably positioned within the respective second receiving bores of the first and second side wall portions, each of the first and second rotary shaft portions being supported to be rotatable between two shaft side surfaces facing each other at each of the second receiving bores, wherein a teeth portion pressure angle is defined by an angle of each of the protrusion side surfaces at the lock bore intersecting relative to a direction in which the engagement protrusion rotates, a shaft portion pressure angle is defined by an angle of each of the shaft side surfaces at the second receiving bore intersecting relative to a height direction orthogonal to the longitudinal direction and the width direction, the shaft portion pressure angle is specified to be greater than the teeth portion pressure angle.

9. The seat slide apparatus according to claim 8, wherein points at which each of the rotary shaft portions makes contact with the two shaft side surfaces and points at which each of the engagement protrusions makes contact with the two protrusion side surfaces are provided horizontally along an extending direction of the seat slide device, the teeth portion pressure angles at the two protrusion side surfaces of the lock bore are specified to be the same as each other and the shaft portion pressure angles at the two shaft side surfaces of the second receiving bore are specified to be the same as each other.

10. The seat slide device according to claim 2, wherein the first rotary shaft portion and the second rotary shaft portion are provided curving relative to the body portion in a state facing each other in the width direction of the body portion,
at least a portion of each of the rotary shaft portions includes a curved surface so that a tip end surface of each of the rotary shaft portions is rollable along a side surface constituting the second receiving bore.

11. The seat slide device according to claim 5, wherein the tip end surface of each of the rotary shaft portions includes a flat surface positioned at a tip end side of each of the rotary shaft portions in a height direction of the second receiving bore and provided along the longitudinal direction of the body portion and two curved surfaces provided at opposed sides of the flat surface in the longitudinal direction of the body portion and positioned on an identical imaginary arc when viewed in the width direction of the body portion, the two curved surfaces making contact in a rollable manner with two side surfaces of the second receiving bore facing each other in the longitudinal direction of the body portion.

12. The seat slide device according to claim 4, wherein the curved surface is provide on only the portion of each of the first and second rotary shaft portions.

13. The seat slide device according to claim 4, wherein each of the first and second rotary shaft portions includes a pair of side surfaces extending in a height direction of the body portion, and each curved surface is arranged at a lower end portion of the corresponding side surface.

* * * * *